(12) United States Patent
Eshet et al.

(10) Patent No.: US 6,674,804 B1
(45) Date of Patent: Jan. 6, 2004

(54) METHOD FOR GENERATING A MULTIPLEXED SEQUENCE OF MEDIA UNITS

(75) Inventors: Amit Eshet, Haifa (IL); Ran Oz, Modiin (IL); Nery Strasman, Ramat Gan (IL); Amit Leventer, Kfar Saba (IL)

(73) Assignee: Bigband Networks, Inc., Fremont, CA (US)

( * ) Notice: Subject to any disclaimer, the term of this patent is extended or adjusted under 35 U.S.C. 154(b) by 175 days.

(21) Appl. No.: 10/011,341

(22) Filed: Nov. 12, 2001

(51) Int. Cl.[7] .................................................. H04N 7/12
(52) U.S. Cl. ................................................. 375/240.26
(58) Field of Search .................. 348/423.1; 375/240.26, 375/240.28

(56) References Cited

U.S. PATENT DOCUMENTS 6,330,286 B1 * 12/2001 Lyons et al. ............ 375/240.28
6,434,197 B1 *  8/2002 Wang et al. ............ 375/240.29
6,512,884 B1 *  1/2003 Sawada ........................ 386/96

* cited by examiner

*Primary Examiner*—Vu Le
*Assistant Examiner*—George A Bugg, Jr.
(74) *Attorney, Agent, or Firm*—Blakely Sokoloff Taylor & Zafman LLP

(57) ABSTRACT

The invention provides a method for efficient multiplexing and modifying of media unit sequences. The invention allocates bit rates to media unit sequences and compresses media units in an optimal manner.

The invention provides a method the includes calculating a sequence time threshold, for each received media unit sequence and executing modification and media unit replacements in view of the sequence time threshold.

91 Claims, 9 Drawing Sheets

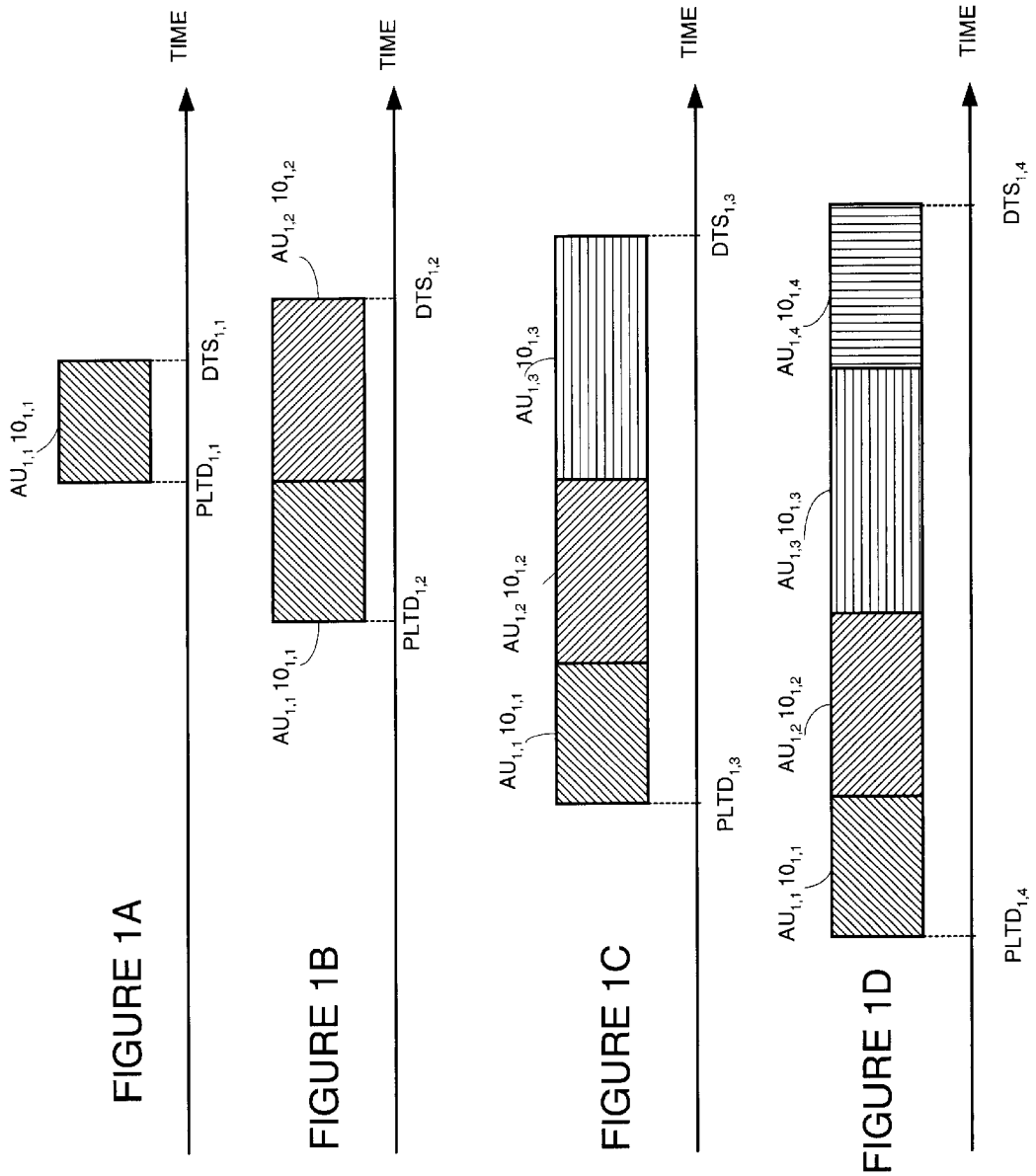

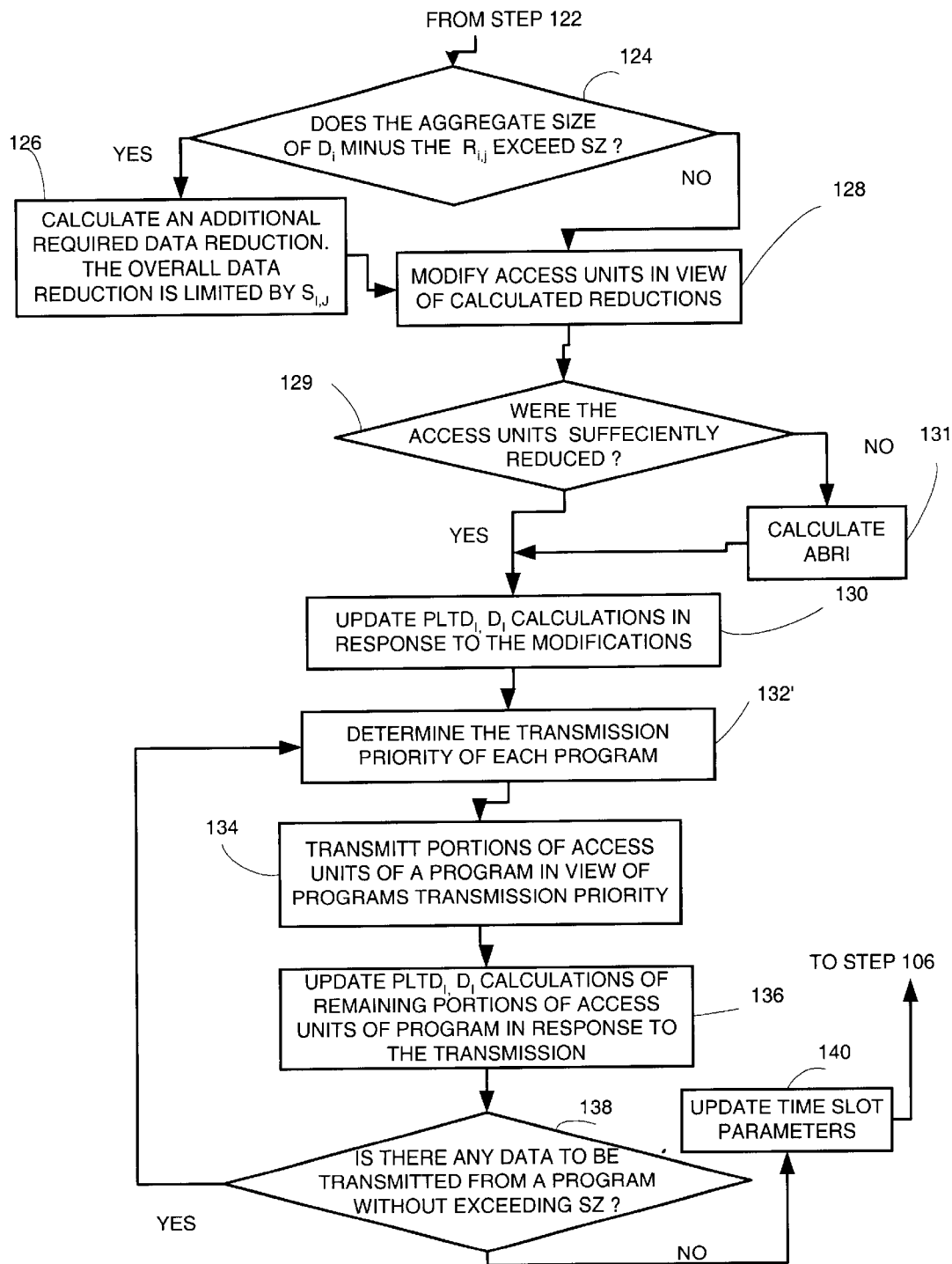
FIG. 7B    101

METHOD FOR GENERATING A MULTIPLEXED SEQUENCE OF MEDIA UNITS

FIELD OF THE INVENTION

The present invention relates to communication methods in general, and to methods for generating multiplexed sequence of media units.

BACKGROUND OF THE INVENTION

Methods and systems for compressing and transmitting media signals are known in the art. Compressed digital video is largely becoming the preferred medium to transmit video to viewers everywhere. Part of the Moving Pictures Experts Group (MPEG) specifications are standardized methods for compressing and transmitting video. Various audio compression techniques, including MPEG compliant techniques, are also known in the art. In general, MPEG is used today for transmitting video over terrestrial, wireless, satellite and cable communication channels and also for storing digital video.

An audio stream is organized as an ordered sequence of frames. A video stream is usually organized as an ordered sequence of pictures, each picture includes a plurality of pixels. A video picture includes a plurality of slices, each slice including a plurality of macro blocks. The audio and video streams are provided to an audio encoder and video encoder respectively to generate compressed audio and video elementary streams, also referred to as elementary streams.

MPEG compression/encoding utilizes various compression schemes, such as adaptive quantization, intra-frame encoding, inter-frame encoding, run length encoding and variable length coding. Intra-frame coding takes advantage of spatial redundancies in a picture. Inter-frame coding takes advantage of temporal redundancies from picture to picture in a video sequence. Inter-frame coding involves motion estimation and motion compensation. There are three types of motion estimations—forward, backward and bidirectional. Macroblocks are the elementary unit for motion compensation and adaptive quantization. Each macroblock is associated with a quantization factor field, representative of the degree of quantization. A slice, including a plurality of macroblocks includes a slice header that has a quantization factor field that is associated with some of the macro blocks of the slice.

Elementary streams are packetized to produce PES packets. PES packets made up of elementary streams that form a program share a common time base. The PES packets may also include additional information. PES packets of distinct elementary streams can be arranged as either a Program Stream or a Transport Stream. A Transport Stream combines one or more programs with one or more independent time bases into a single stream. Transport Streams include transport packets of 188 bytes. Transport Stream packets start with a transport packet header. The header includes a packet ID (PID). Transport Stream packets of one PID value carry data of a single elementary stream. Transport Streams include Program Specific Information (PSI) tables. The PSI tables specify which PIDs and accordingly which elementary streams are associated to form each program.

Transport Streams may be of either fixed or variable bit rate. Some programs of the Transport Stream are of a variable bit rate, if, for example, more bits are allocated to complex scenes, and less bits are allocated to more simple scenes.

Transport Streams are provided, usually via a communication medium, to a target decoder, that decodes the encoded elementary streams within the Transport Stream. The decoding of encoded elementary stream is based upon timing information embedded within Transport packets, packs and PES packets. Such timing information includes various time stamps such as decoding time stamp (DTS) and presentation time stamp (PTD), DTS indicating the time that an access unit is decoded at the target decoder to provide a presentation unit, PTS indicating the time that the presentation unit is presented at the target decoder.

The ISO/IEC 13818-1 specification defines a channel as a digital medium that stores or transports a Transport Stream. The aggregate bandwidth of all the components of the Transport Stream must not exceed, at any time, the available bandwidth of the channel. Transport Streams are provided to a channel of a limited available bandwidth/storage space.

Various lossy and lossless techniques are implemented to adapt the aggregate bandwidth of the programs of a Transport Stream to the available bandwidth of a channel. Lossless techniques do not require further compressing of media pictures. Lossless techniques also include delaying or advancing a transmission of elementary data. Lossy techniques involve additional compression, and are usually implemented whenever the appliance of lossless techniques is not feasible or does not provide sufficient results. The further compression usually results in visual quality degradation.

There is a need to provide a method that allows for smoothing data reductions and allocating bit rates in an optimal manner. There is a need for a method that allows for predicting a need for implementing lossy techniques and accordingly spread the data reduction among a relatively large number of access units, programs, elementary streams and/or elementary stream portions.

SUMMARY OF THE PRESENT INVENTION

It is an object of the present invention to provide novel methods for data reduction, and especially for an efficient method for data reduction of data belonging to various programs being transmitted over a single telecommunication channel. The methods involve bandwidth/bit-rate limitations predictions, and allowing for changing the timing of a transmission of media units. A media unit is a set, a sequence or a group of signals representative of audio and/or visual content. Media unit can include at least one macroblock, but can also include portions of macroblocks. It is noted that if the data reduction includes motion compensation and/or adaptive quantization than the media unit includes at least one macroblock.

The invention provides a method that includes calculating a sequence time threshold, for each received media units sequence, a sequence usually includes groups of macroblocks, and executing modification and replacement of media units in view of the sequence time threshold.

The invention provides a method for generating a multiplexed sequence, the method includes the steps of: (a) receiving at least one media unit sequence; (b) calculating a sequence time threshold, for each received media unit sequence, in response to: (i) timing information embedded within the media unit sequence, (ii) an estimated allocated bit rate of the media unit sequence, and (iii) aggregate size of at least some media units belonging to the media unit sequence; (c) determining, for each media unit sequence, which media units to append to the multiplexed sequence and which media units to modify to provide corresponding modified media units, in response to the sequence time threshold; and (d) modifying media units, appending media units and corresponding modified media units, in response to the determination.

The invention provides a method for generating a multiplexed sequence, the method includes the steps of: (I) receiving at least one media unit sequence; (II) defining, for each media unit sequence, a media unit sub-sequence comprising media units that are complying with a sub-sequence timing constraint; (III) for each media unit sub-sequence performing the steps of: (III.I) calculating a sub-sequence time threshold, in response to: (a) timing information embedded within the media unit sub-sequence, (b) an estimated allocated bit rate of the media unit sub-sequence, and (c) aggregate size of at least some media units belonging to the media unit sub-sequence; (III.II) decreasing the size of the media unit sub-sequence, by modifying at least one media unit belonging to the media unit sub-sequence to generate at least one corresponding modified media unit, in response to a bit rate allocated to the media unit sub-sequence; and (III.III) appending the at least one corresponding modified media unit in place of the at least one media unit to the multiplexed sequence, if the at least one corresponding modified media unit was generated during the step of decreasing the size of the media unit sub-sequence.

The invention provides a method for generating a multiplexed sequence, the method includes the steps of: (aa) receiving at least one media unit sequence; (bb) for each media unit sequence performing the steps of: (bb.1) calculating a sequence time threshold, in response to: (a) timing information embedded within the media unit sequence, (b) an estimated allocated bit rate of the media unit sequence, and (c) aggregate size of at least some media units belonging to the media unit sequence; (bb2) determining a target size of a media unit group in response to the corresponding sequence time threshold, the media unit group comprising at least some of the media units of the sequence; (bb3) decreasing the size of the media unit group by modifying at least one media unit of the media unit group, to generate at least one corresponding modified media unit, if the size of the media unit group is greater than the target size; and (bb4) appending at least one corresponding modified media unit in place of the media units to the multiplexed sequence, if the at least one corresponding modified media unit was generated during the step of decreasing the size of the media unit group.

The invention provides a method in which an allocated estimated bit rate can be responsive to a media unit sequence priority. Data reduction of media units can also be responsive to a media unit sequence priority.

BRIEF DESCRIPTION OF THE DRAWINGS

The present invention will be understood and appreciated more fully from the following detailed description taken in conjunction with the drawings in which:

FIGS. 1A–1D are timing diagrams, in accordance to a preferred embodiment of the invention;

FIGS. 7A–7B illustrate a method for generating a multiplexed sequence of media units, according to a preferred embodiment of the invention.

DETAILED DESCRIPTION OF PREFERRED EMBODIMENTS

Figure 2A:
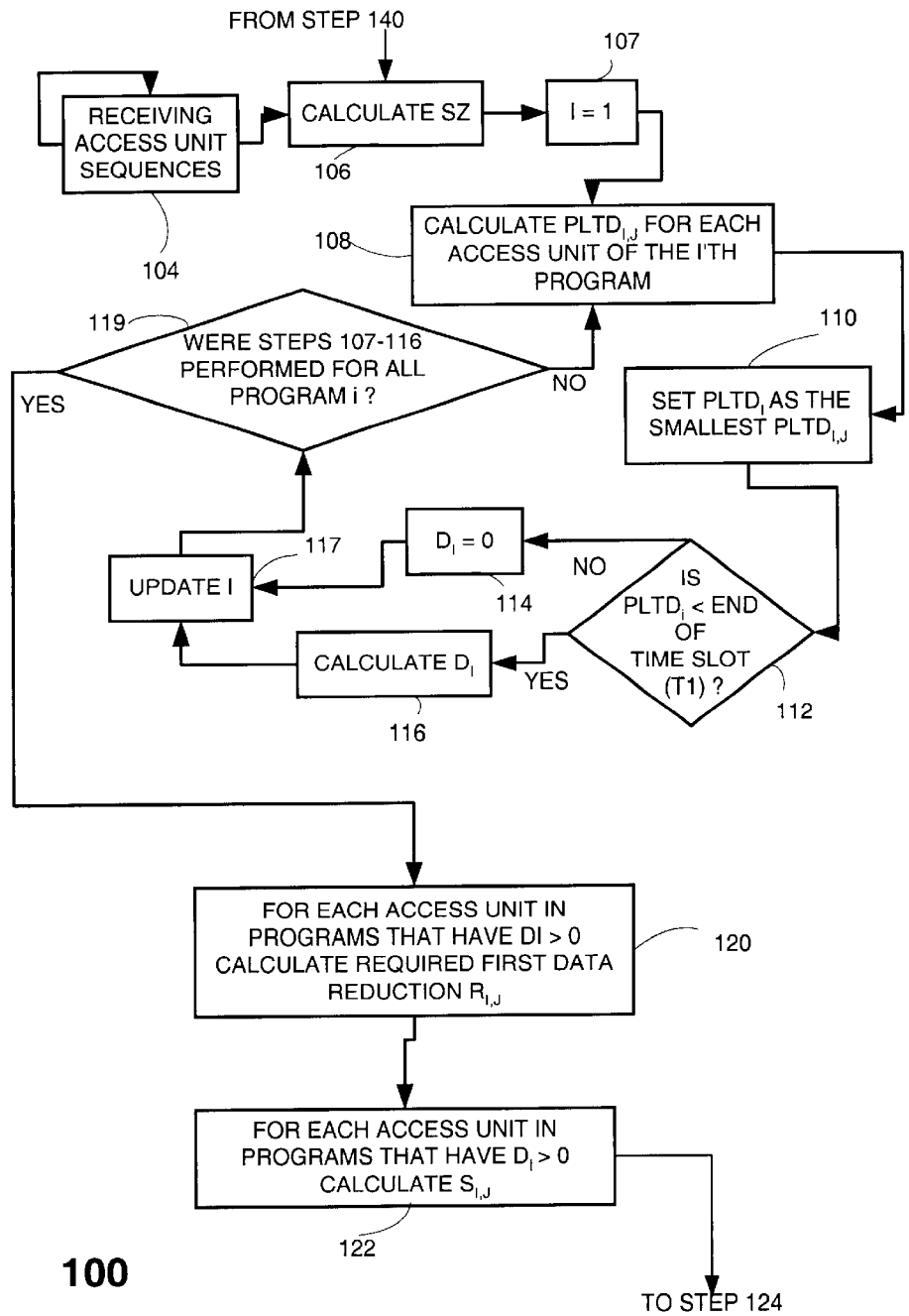
FIGS. 2A–2B illustrate a method for generating a multiplexed sequence of media units, in accordance to a preferred embodiment of the invention.

For convenience of explanation, the following detailed description and associated drawings refer to an MPEG compliant Transport Stream, including at least one program, each program including a plurality of access units, and each access unit includes a plurality of slices. It is noted that the invention is not limited to said signals and specification and can be implemented on various media unit sequences and sub-sequences, without falling out of the true spirit of the invention. For example, the invention is applicable to video and audio streams, either MPEG compliant or not, data streams and the like.

The invention provides a method that allows for predicting a multiplexed sequence characteristics in advance. The prediction allows for spreading media unit modifications among a plurality of media units.

According to an aspect of the invention, the prediction is responsive to an estimated allocated bit rate (required bandwidth) of each media unit sequence. The estimated allocated bit rate can be responsive to various characteristics of the media unit sequence, such as average bit rate, peak bit rate, bit rate statistics, media units size, media unit timing information, and the like. The estimated allocated bit rate can also be responsive to additional parameters such as media unit sequence priority, delay sensitivity, predicted channel behavior and the like.

The invention provides a system that adjusts to dynamic changes in a transmission channel available bit rate.

The following are definitions and abbreviations, which are used throughout the description of the disclosed technique:

AU (Access Unit): A coded representation of a presentation unit. In case of video an access unit includes all the coded data for a picture, and any stuffing that follows it. $AU_{i,j}$: the j'th access unit of the i'th program. For convenience of explanation is assumed that lower index J values are allocated to access units that have earlier decoding time stamps.

AUPD (Access Unit Pending Data): A size of an access unit that was received but not transmitted. $AUPD_{i,j}$: the access unit pending data of the j'th access unit of the i'th program.

DTS (Decoding Time Stamp): A field that indicates the time that an access unit is decoded in the system target decoder. $DTS_{i,j}$: the decoding time stamp of the j'th access unit of the i'th program.

PPD (Program Pending Data): For a given access unit, the aggregate size of all access units/access unit portions that are characterized by a DTS that precedes the DTS of the given access unit. $PPD_{i,j}$: the program pending data of the j'th access unit of the i'th program. Assuming that the access units are sorted by their decoding time stamps, the access unit having the earliest DTS out of the access units of the i'th program is $AU_{i,1}$ then $PPD_{i,j}=\Sigma AUPD_k$, whereas k=1 . . . j.

PLTD (Pending Data Last Time to Deliver): Latest time for starting the transmission of a given access unit and all previous access units from the same program (having earlier decoding time stamps), so that the data will reach the decoder before its DTS, whereas these access unit are transmitted (appended to the multiplexed sequence) at an estimated allocated bit rate. $PLTD_{i,j}$: the PLTD of the j'th access unit of the i'th program. It is noted that $PLTD_{i,j}=DTS_{i,j}-(PPD_{i,j}/BR_i)$. $BR_i$ is the estimated allocated bit rate of the i'th program. $PLTD_i$: the PLTD of the i'th program. $PLTD_i=minimun(PLTD_{i,j})$.

It is noted that $PLTD_{i,j}$ is responsive to $BR_i$. The allocation of bandwidth among the various programs has a significant influence on $PLTD_{i,j}$ and $D_i$. $D_I$ being an amount of data that must be delivered from the i'th program during a timeslot.

$BR_i$ can be calculated according to various schemes. It can be responsive to each of the following parameters, or to a combination of at least one of the following parameters: an input bit rate of a program, a maximal bit rate allowed for transmitting a single program, a maximal bit rate allowed for transmitting the Transport Stream, the time period during which all the received access units of a program must be transmitted, and the like. Such a Transport Stream usually includes a plurality of programs. Conveniently, $BR_i$ is repeatedly calculated, for allowing dynamic tracking of the programs behavior and of the communication channel behavior. According to an aspect of the invention, $BR_i$ is proportional to an aggregate size of the original access units (before being modified) of the i'th program and is inversely proportional to a time period during which they must be transmitted. The time period equals the difference between the DTS of the last AU and the current time.

The mentioned above terms are tailored to MPEG compliant media unit sequence that include access units, slices, packets, and decoding time stamps. It is noted that the invention is not limited to such a media unit sequence. Accordingly, AUPD, PPD, DTS and PLTD can be replaced by analogues sizes, aggregate sizes, timing information, other sequence time thresholds, sub-sequence time thresholds or media unit time thresholds.

Another manner for calculating $BR_i$ takes into account worst case scenarios that require larger bandwidth allocations. In these scenarios the data reduction is determined on a timeslot to timeslot basis. $BR_i$ is calculated by the following steps:

Calculating a variable $PS^{i,g}$: $PS^{i,g}=|AU^{i,1}|+\ldots+|AU^{i,g}|$.
Calculating $IBR^{i,g}$: $IBR^{i,g}=PS^{i,g}/(DTS^{i,g}-T0)$. Wherein T0 indicates a start of an iteration period.
Calculating $B_i$: $B_i=max\{IBR^{i,g}\}1\leq g\leq G$.
Calculating a normalized bit rate: $BR_i=B_i*(BW_T/\Sigma B_i)$.

Whereas G is the number of access units of the i'th program; $|AU^{i,g}|$ is the size of the g'th access unit of the i'th program, before being modified; $BW_T$ is the available bandwidth of the communication media.

It is noted that bit-rate allocation and bandwidth allocations are analogues to each other.

The invention provides a method for performing optimal data reductions, by limiting the modifications in view of program constraints, timing constraints, and/or user's constraints.

The invention provides an efficient method for allocating bandwidth and performing media unit modification, that does not require a complex analysis of the received media units. Usually, the allocation and the modification are based only upon the size of the received media units and their timing constraints.

According to an aspect of the invention, the media unit sequences are MPEG compliant. Conveniently, the media units are access units and the media unit sequences are programs or elementary streams. The timing information includes time stamps such as decoding time stamp or presentation time stamps.

The estimated allocated bandwidth of an i'th sequence can also be calculated by the steps of: calculating $PS^{i,g}$: $PS^{i,g}=|AU^{i,1}|+\ldots+|AU^{i,g}|$; calculating $IBR^{i,g}$: $IBR^{i,g}=PS^{i,g}/(DTS^{i,g}-T0)$; whereas T0 denotes a start of a relevant timeslot; calculating $B_i$: $B_i=max\{IBR^{i,g}\}1\leq g\leq G$; and calculating a normalized bit rate: $BR_i=B_i*(BW_T/\Sigma B_i)$; whereas G is a number of media units of the i'th sequence of media units; $|AU^{i,g}|$ is a size of a g'th media unit of the i'th sequence of media units, before being modified; $BW_T$ is the aggregate available bit rate of a communication medium over which the multiplexed sequence is to be transmitted; $DTS^{i,g}$ is the decoding time stamp of the g'th media unit of the i'th media unit sequence; $PPD^{i,g}$ is a media unit sequence pending data of the g'th media unit of the i'th media unit sequence.

According to an aspect of the invention media units may be modified in response to their media unit time threshold.

According to an aspect of the invention the amount of data reduction is limited by a low data reduction limit, the low data reduction limit reflecting data that cannot be sent during a time slot even when a maximal bit rate is allocated to the media unit sequence. Conveniently, the maximal bit rate reflects media unit sequence constraints, communication channel constraints, end user constraints and the like. Preferably, the media unit sequence is MPEG compliant, and the maximal bit rate reflects a maximal allowed input bit rate to an elementary buffer (EB).

According to an aspect of the invention the amount of data reduction is limited by a high data reduction limit, the high reduction limit reflecting a maximal data reduction that still effects the sequence time threshold.

According to yet a further aspect of the invention $BR_i$ is set to a normalized maximal allowed bit rate for a program, or to a portion of that amount. The normalization reflects a multiplication of the maximal allowed bit rate per program by $(BW_T/\Sigma B_i)$. For example, as long as $BW_T>\Sigma B_i$, $BR_i$ can be set to be 15 Mbits/Sec*$(BW_T/\Sigma B_i)$.

A delay that is introduced to all the packets of the same program is referred to as program delay. Longer program delays allow better prediction of bottlenecks, and allow for spreading a required compression among more access units. It is further noted that the program delay can be limited by various timing and system thresholds, such as thresholds resulting from available system resources (such as buffer size) or thresholds resulting from real time broadcast requirements. The method allows for determining distinct program delays to distinct programs.

FIGS. 1A–1D are timing diagrams illustrating some of the mentioned above definitions. Access units $AU_{1,1}-AU_{1,4}$, $10_{1,1}-10_{1,4}$ have decoding time stamps $DTS_{1,1}-DTS_{1,4}$ accordingly. $DTS_{1,1}<DTS_{1,2}<DTS_{1,3}<DTS_{1,4}$. Each access unit is illustrated in terms of the time period required to transmit the access unit at a given bit rate $BR_1$. Accordingly, $AUPD_{1,1}=(DTS_{1,1}-PLTD_{1,1})*BR_1$. $(AUPD_{1,1}+AUPD_{1,2})=(DTS_{1,2}-PLTD_{1,2})*BR_1$. $(AUPD_{1,1}+AUPD_{1,2}+AUPD_{1,3})=(DTS_{1,3}-PLTD_{1,3})*BR_1$. $(AUPD_{1,1}+AUPD_{1,2}+AUPD_{1,3}+AUPD_{1,4})=(DTS_{1,4}-PLTD_{1,4})*BR_1$.

$PLTD_{1,1}$ reflects the latest time for allowing a compliant transmission of $AU_{1,1}$, as $AU_{1,1}$ has the smallest (earliest) decode time stamp. $PLTD_{1,1}$ equals $DTS_{1,1}$ minus the time period required for a transmission of $AU_{1,1}$. $PLTD_{1,2}$ reflects the latest time for allowing the compliant transmission of $AU_{1,1}$ and $AU_{1,2}$ as $DTS_{1,1}<DTS_{1,2}$. $PLTD_{1,2}$ equals $DTS_{1,2}$ minus the time period required for a compliant transmission of both $AU_{1,1}$ and $AU_{1,2}$. $PLTD_{1,3}$ reflects the latest time for allowing the compliant transmission of $AU_{1,1}$, $AU_{1,2}$ and $AU_{1,3}$ as $DTS_{1,1}<DTS_{1,2}<DTS_{1,3}$. $PLTD_{1,3}$ equals $DTS_{1,3}$ minus the time period required for a transmission of $AU_{1,1}$, $AU_{1,2}$ and $AU_{1,3}$. $PLTD_{1,4}$ reflects the latest time for allowing the transmission of $AU_{1,1}$, $AU_{1,2}$, $AU_{1,3}$ and $AU_{1,4}$ as $DTS_{1,1}<DTS_{1,3}<DTS_{1,4}$. $PLTD_{1,4}$ equals $DTS_{1,4}$ minus the time period required for a transmission of $AU_{1,1}$, $AU_{1,2}$, $AU_{1,3}$ and $AU_{1,4}$. Assuming that the first program (i=1) includes these four access units $PLTD_1 = minimum(PLTD_{1,j}$, for j=1 to 4)=$PLTD_{1,4}$. It is noted that not each access unit necessarily influences the $PLTD_i$.

The method includes various steps such as calculations, determinations, modifications and multiplexing steps. Conveniently, in order to reduce the computational load associated with the implementation of the following methods, these steps are performed in iterations. During each iteration the method handles media units belonging to a media unit sub-sequence. The media units comply to a sub-sequence timing constraint, such as a timing threshold. Accordingly, during each iteration the method is applied on access units that are characterized by decoding time stamps that do not exceed a timing threshold. Assuming that the method is currently processing $AU_{i,j}$ at time $T_{current}$ then the timing threshold equals $T_{current}+T_{max}$, whereas $T_{max}$ equals $(PPD_i-PPD_{i,j})/BR_i$. Usually $T_{max}+T_{current}>>T1$, T1 being the upper time limit of a time slot during which access units are scheduled to be transmitted in the current iteration of method 100 of FIGS. 2A and 2B.

Figure 2B:
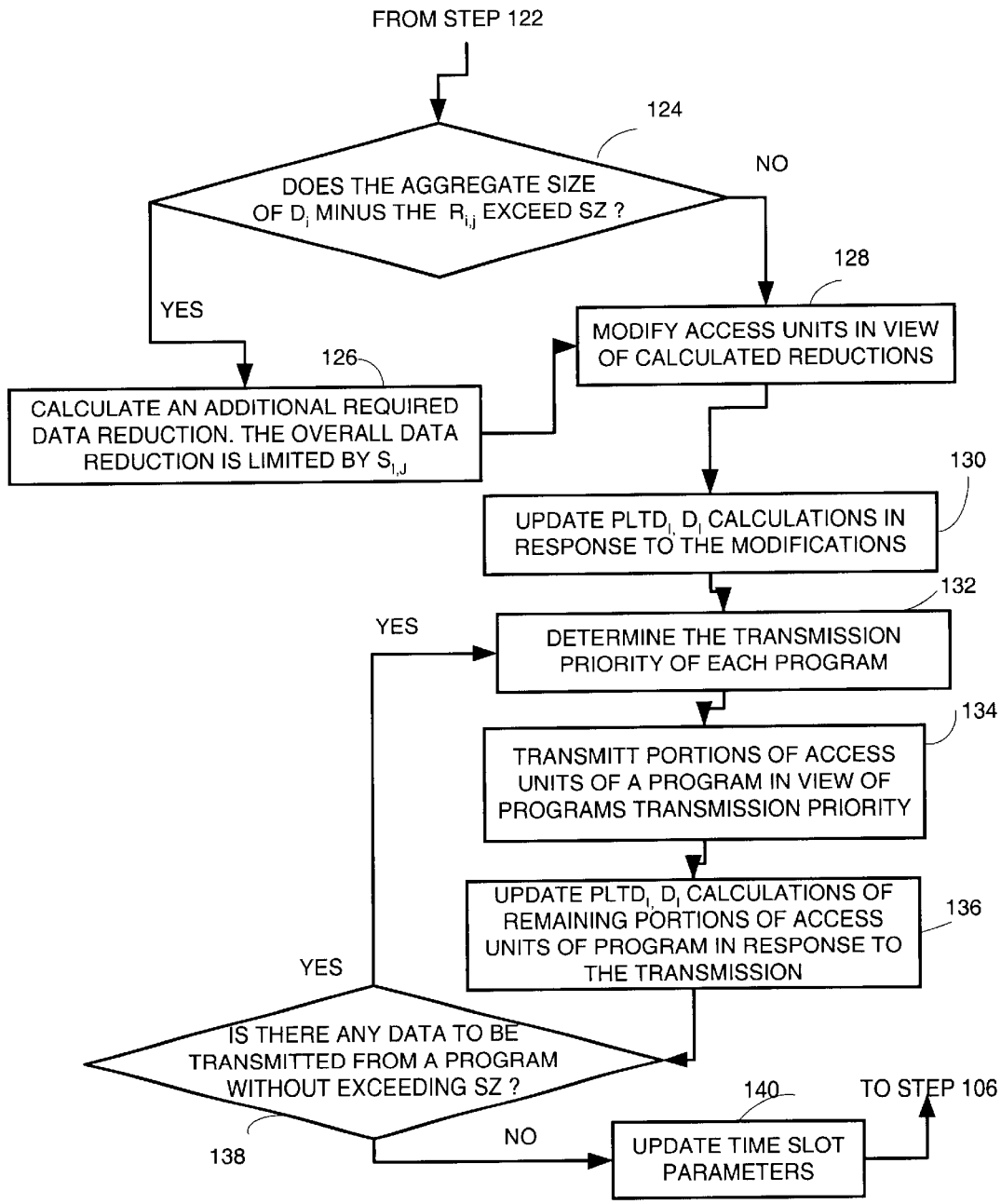

Referring to FIGS. 2A–2B, illustrating method 100 for generating a multiplexed sequence of media units. FIG. 2A illustrates some steps of method 100 that are linked to other steps illustrated by FIG. 2B.

Method 100 starts at step 104 of receiving at least one program. Each Program includes a plurality of access units. It is noted that step 104 is executed in parallel to other steps of method 100. Accordingly, access units can be constantly received while steps 106–140 are executed. An arrow that extends from box 104 to itself reflects the continuous reception of access units.

Step 104 is followed by step 106 of calculating an aggregate size of the Transport Stream (the aggregate size denoted SZ) to be transmitted during a time slot that has a predefined length. The time slot ends at T1. It is noted that the Transport Stream can be transmitted over a communication channel of a varying bandwidth. Accordingly, changes in the bandwidth can change SZ. The aggregate size is also responsive to changes in the length of the time slot.

For convenience of explanation it is assumed that the received access units belong to a plurality of programs, starting from a first program. Accordingly, step 106 is followed by step 107 of setting index i to one.

Step 107 is followed by a sequence of steps including 108–119, that are repeated until all the pending programs have their $PLTD_1$ and $D_i$ calculated.

Step 108 includes calculating $PLTD_{i,j}$ for each of the received access units of the i'th program.

Step 108 is followed by step 110 of selecting $PTLD_i$ for the i'th program as the smallest (earliest) $PLTD_{i,j}$ out of the PTLD of access units belonging to the i'th program.

Step 110 is followed by query step 112 of checking, if $PLTD_i$ occurs before the end of the predefined timeslot ($PLTD_i<T1$). If the answer is "yes" query step 112 is followed by step 116 of computing the amount of data $D_i$ that must be delivered from the i'th program during the predefined time slot. If the answer is "no", query step 112 is followed by step 114 of setting $D_i$ to zero, meaning that during the time slot data that belongs to that program will not necessarily be transmitted. Steps 114 and 116 are followed by steps 117 of updating index i and checking whether steps 107–116 were performed for all the programs, If the answer is "yes" step 119 is followed by step 120, else step 119 is followed by step 108.

Step 120 includes calculating, for each program that has $D_i>0$, an amount of data reduction $R_{i,j}$, for access units $AU_{i,j}$ that cannot be sent during the time slot without violating the program constraints. Assuming that the access units of each programs are ordered such that the access unit having the earlier decode time stamp have lower j index values. If a sub sequence includes $AU_{i,1}-AU_{i,k}$ and $DTS_{1,1}<DTS_{1,2}< \ldots DTS_{1,K}$ then $R_{1,1}$ reflects the amount of data to be reduced from $AU_{1,1}$, $R_{1,2}$ reflects the amount of data to be reduced from $AU_{1,1}$ and $AU_{1,2}$, $R_{1,k}$ reflects the amount of data to be reduced from all the access units of the sub-sequence.

ISO/IEC 13818-1 describes a Transport Stream System Target Decoder (T-STD). T-STD has three types of decoders for decoding video, audio and system (data) streams. The video decoder includes transport buffer (TB), a elementary stream buffer (EB) and a multiplexing buffer (MB) coupled between both buffers, whereas the TB buffer precedes MB. Each buffer has a predefined input rate and removal rate. The maximal input rate to EB is 15 Mbit/Sec. Program constraints are driven from a T-STD model. A simplified model of T-STD, that mainly reflects the EB behavior limits the maximal bit rate allocated to a program to 15 Mbit/Sec. Accordingly, $R_{i,j}$ is calculated by setting $BR_i$ to 15 Mbit/Sec and determining whether all the relevant access units can be sent during the time slot.

Step 120 is followed by step 122 of determining a maximal data reduction that still effects $D_i$. These amount are denoted $S_{i,j}$, whereas $S_{i,j}$ reflects a size reduction (that still effect $D_i$) from access unit $AU_{i,j}$ and additional access unit of the access unit sub-sequence that are characterized by a decoding time stamp that is earlier than or equal to $DTS_{i,j}$.

Step 122 is followed by query step 124 of checking if the aggregate size of $D_i$, for each program that has $D_i>0$, after reducing $R_{i,j}$, is within the limits of SZ: $\Sigma(D_i-R_{i,j})>SZ?$. If the answer is "yes" an additional data reduction is required and step 124 is followed by step 126, else step 124 is followed by step 128.

Step 126 includes reducing the size of access units of programs that are characterized by $D_i-\Sigma R_{i,j}>0$. The reducion of $AU_{i,j}$ is limited by $S_{i,j}$. These reductions are denoted $Q_{i,j}$.

Step 126 is followed by step 128 of modifying access units in view of calculated reductions, such as $R_{i,j}$ and $Q_{i,j}$. It is noted that in many cases the modifications can result in greater reductions than those required according to $R_{i,j}$ and $Q_{i,j}$. Accordingly, additional information can be transmitted, even if it was not initially scheduled to be transmitted during the time slot. The aggregate size (M) of additional information reflects the difference between SZ and the aggregate size of $D_i$.

Additional information can also be transmitted if $\Sigma D_i<SZ$.

Step 128 is followed by step 130 of calculating $PLTD_i$, $D_i$, in response to the modifications. These parameters need to be updated as they are influenced by the size of access units.

Step 130 is followed by step 132 of determining a program transmission priority $P_i$. $P_i$ is responsive to $PLTD_i$, and optionally to additional parameters such as a predefined program priority, the characteristics of the program, and the like.

Step 132 is followed by step 134 of transmitting portions of access units from the highest priority program.

Conveniently, access units belonging to the highest priority program are transmitted if (i) none of the program's constraints is violated, (ii) the aggregate amount of data transmitted during the timeslot does not exceed SZ. It is noted that an access unit can include a plurality of portions, such as slices. The slices of the same access unit have the same DTS. Usually an access unit includes a plurality of macroblock groups. A macroblock group includes at least two macroblocks, usually at least two consecutive macroblocks. Conveniently, if a whole access unit cannot be sent during a timeslot, some of its macroblock groups can be sent. A whole macroblock group would be delivered, even if it means that more than $D_i$ data should be delivered from the i'th program if the transmission does not prevent a transmission of $D_n$ amount of data from any other program, variable n does not equal variable i. Else, a part of a macroblock group can be transmitted.

Step 134 is followed by step 136 of calculating $PLTD_i$, $D_i$, of the highest priority program in response of the transmission.

Step 136 is followed by query step 138 of determining whether additional data can be transmitted from any of the programs without violating any program constraints and without exceeding SZ.

If the answer is "yes" step 138 is followed by step 132, else step 138 is followed by step 140 of initializing timing parameters, to start the calculations of a new time slot. Step 140 is followed by step 106.

Figure 3:
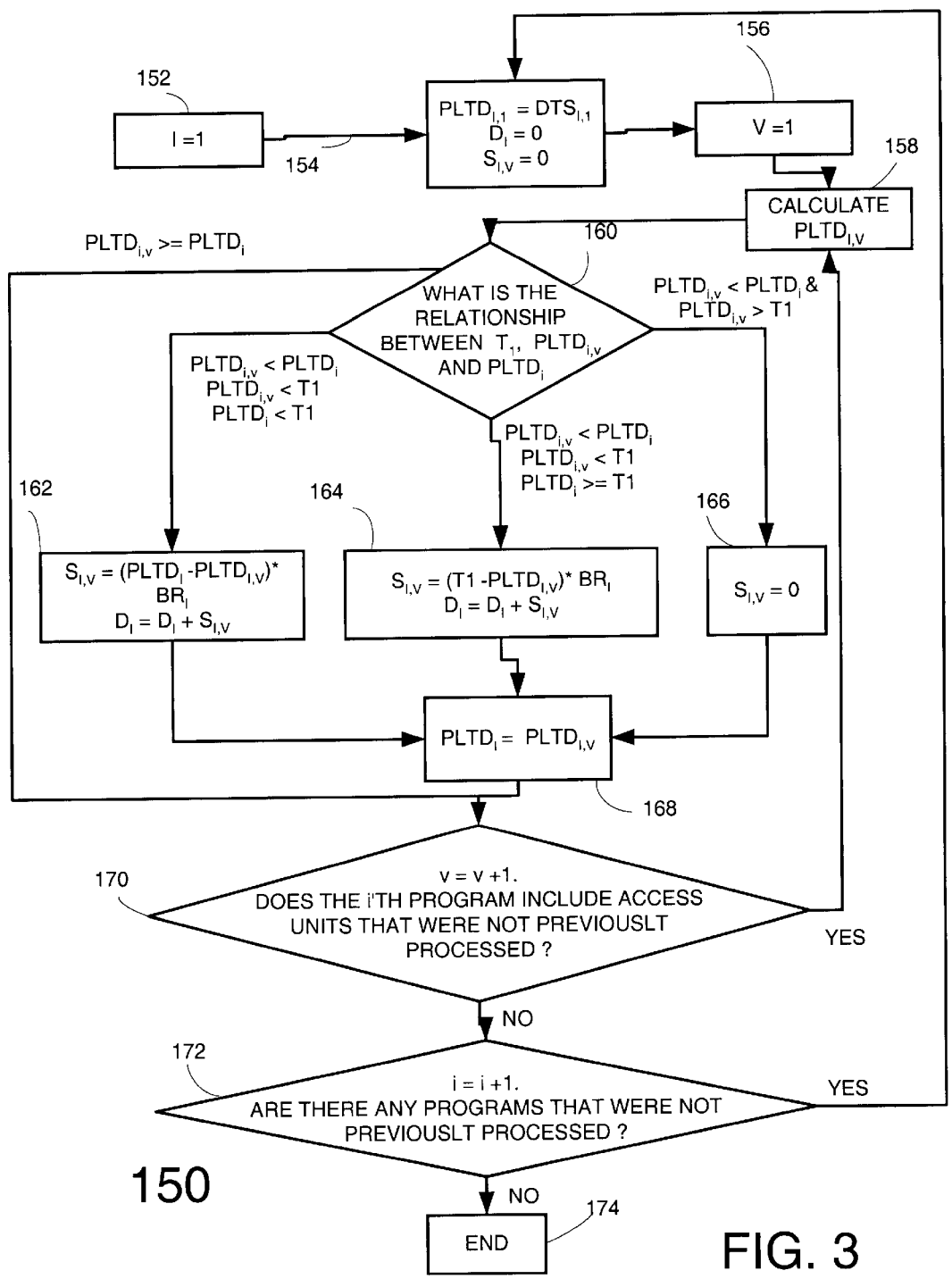
FIG. 3 is a flow chart diagram illustrating a method for calculating $PLTD_{i,j}$, $R_{i,j}$ and $D_i$, in accordance to a preferred embodiment of the invention.

FIG. 3 further illustrates method 150 for calculating $PLTD_{i,j}$, $S_{i,j}$ and $D_i$. Assuming that the timeslot starts at T0 and ends at T1. It is noted that various steps of method 150 can be implemented during method 100.

Method 150 starts at step 152 of setting index I to one. Step 152 is followed by step 154 of setting $PLTD_i$, $S_{i,j}$, and $D_i$ for all values of index i and an index v: $PLTD_i=DTS_{i,1}$; $S_{i,V}=0$; $D_i=0$.

Step 154 is followed by step 156 of setting an index v to one.

Step 156 is followed by a loop that includes steps 158–170.

Step 158 includes calculating $PLTD_{i,V}$ in response to $PPD_{i,V}$, $DTS_{i,V}$ and $BR_i$.

Step 158 is followed by step 160 of comparing $PLTD_{i,V}$, $PLTD_i$, and T1. If $PLTD_{i,V}<PLTD_i$, $PLTD_{i,V}<T1$ and $PLTD_i<T1$ then step 160 is followed by step 162 of setting $S_{i,V}$ and $D_i$: $S_{i,V}=(PLTD_i-PLTD_{i,V})*BR_i$. $D_i=D_i+S_{i,V}$. If $PLTD_{i,V}<PLTD_i$, $PLTD_{i,V}<T1$ and $PLTD_i>=T1$ then step 160 is followed by step 164 of setting $S_{i,V}$ and $D_i$: $S_{i,V}=(T1-PLTD_{i,V})*BR_i$. $D_i=D_i+S_{i,V}$. If $PLTD_{i,V}<PLTD_i$, $PLTD_{i,V}>T1$ then 160 is followed by step 166 of setting $S_{i,V}=0$. If $PLTD_{i,V}>=PLTD_i$ then step 160 is followed by step 170. Steps 162, 164 and 166 are followed by step 168 of setting $PLTD_i$: $PLTD_i=PLTD_{i,V}$. Step 168 is followed by step 170 of increasing v and checking if the i'th program includes access units that were not processed during steps 160–168. If the answer is "yes" step 170 is followed by step 158. Else, step 170 is followed by step 172 of increasing index i and checking if there are still programs that were not processed during previous steps. If the answer is "yes" step 172 is followed by step 154. Else, step 172 is followed by step 174 denoted "end".

Figure 4:
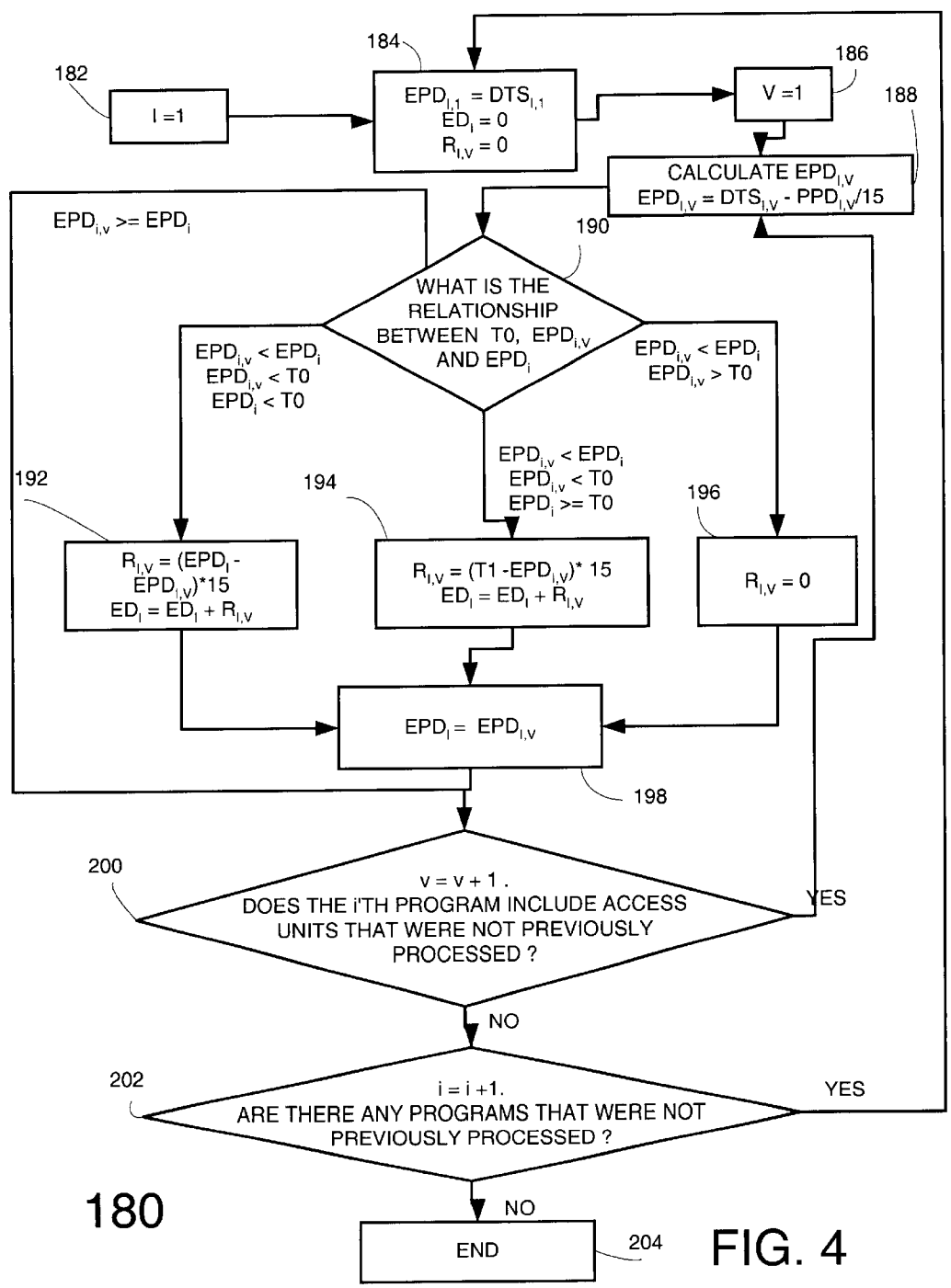
FIG. 4 is a flow chart diagram illustrating a method for calculating $S_{i,j}$, in accordance to a preferred embodiment of the invention.

FIG. 4 further illustrates method 180 for calculating $R_{i,j}$. It is assumed that the timeslot starts at T0 and ends at T1.

Method 180 starts at step 182 of setting index i to one. Step 182 is followed by step 184 of setting temporary variables $EPD_i$ and $ED_i$ and $R_{i,V}$ for all values of indexes i and v: $EPD_i=DTS_{i,1}$; $R_{i,V}=0$; $ED_i=0$. $EPD_i$ and $ED_i$ are variables.

Step 184 is followed by step 186 of setting index v to one.

Step 186 is followed by a loop that includes steps 188–200.

Step 188 includes calculating $EPD_{i,V}$: $EPD_{i,V}=DTS_{i,V}-(PPD_{i,V}/15 \text{ Mbit/Sec})$.

Step 188 is followed by step 190 of comparing $EPD_{i,V}$, $EPD_i$, and T0. If $EPD_{i,V}<EPD_i$, $EPD_{i,V}<T0$ and $EPD_i<T0$ then step 190 is followed by step 192 of setting $R_{i,V}$ and $ED_i$: $R_{i,V}=(EPD_i-EPD_{i,V})*15$ MBIT/SEC. $ED_i=ED_i+R_{i,V}$. If $EPD_{i,V}<EPD_i$, $EPD_{i,V}<T0$ and $EPD_i>=T0$ then step 190 is followed by step 194 of setting $R_{i,V}$ and $ED_i$: $R_{i,V}=(T0-EPD_{i,V})*15$ MBIT/SEC. $ED_i=ED_i+R_{i,V}$. If $EPD_{i,V}<EPD_i$, $EPD_{i,V}>T0$ then 190 is followed by step 196 of setting $R_{i,V}=0$. If $EPD_{i,V}>=EPD_i$ then step 190 is followed by step 200. Steps 192, 194 and 196 are followed by step 198 of setting $EPD_i$: $EPD_i=EPD_{i,V}$. Step 198 is followed by step 200 of increasing v and checking if the i'th program includes access units that were not processed during steps 190–198. If the answer is "yes" step 200 is followed by step 188. Else, step 200 is followed by step 202 of increasing index i and checking if there are still programs that were not processed during previous steps. If the answer is "yes" step 202 is followed by step 184. Else, step 202 is followed by step 204 "end".

According to an aspect of the invention $R_{i,j}$ is approximated by $D_i-(T1-T0)*BR_i$ or by $D_i-(T1-T0)*15$.

Figure 5:
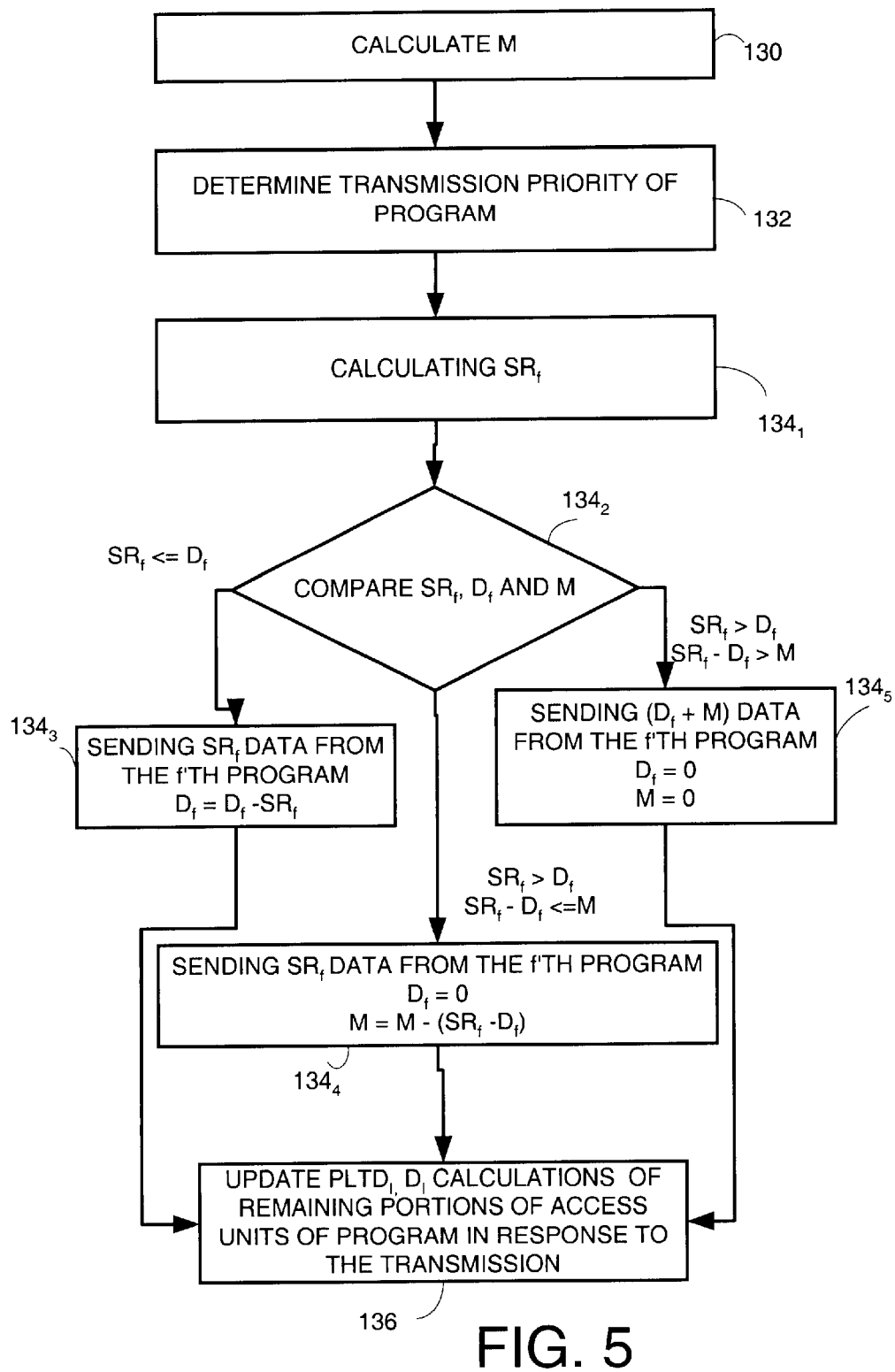
FIG. 5 is a flow chart diagram illustrating in greater details some steps of the method of FIG. 2, according to a preferred embodiment of the invention.

According to an aspect of the invention macroblocks are arranged in macroblock groups. Portions of a macroblock group can be transmitted during different timeslots, for allowing better bandwidth utilization. Nevertheless, it may be desired to send a macroblock group as a whole. Accordingly, if $D_I$ allows to send only a portion of a macroblock group, the additional information can include the other portion of the macroblock group. Referring to FIG. 5 illustrating in greater details steps 130–138 of method 100, according to another preferred embodiment of the invention. According to this aspect of the invention the transmission of additional data is combined with the transmission of data that must be transmitted.

Step 130 of updating the calculations of $PLTD_i$ and $D_i$ includes calculating the aggregate size M of additional information that can be sent from all programs. $M=SZ-\Sigma D_i$, whereas $D_i$ reflects the amount of data that must be sent from the i'th program, after performing data reduction.

Step 130 is followed by step 132 of determining the transmission priority of each program. For convenience of explanation it is assumed that the programs are ordered by their priority, whereas the program with the highest priority is the f'th program.

Step 132 is followed by steps $134_1$–$134_5$ that are collectively denoted 134.

Step $134_1$ includes calculating a size of a first macroblock group from the f'th program that was not appended to the multiplexed sequence. The size is denoted $SR_f$.

Step $134_1$ is followed by query step $134_2$ of comparing $SR_f$, $D_f$ and M. If $SR_f$ does not exceed $D_f$ then step $134_2$ is followed by step $134_3$ of sending $SR_f$ data from the f'th program and updating $D_f$: $D_f=D_f-SR_f$. If $SR_f>D_f$ and $(SR_f-D_f)$ does not exceed M then step $134_2$ is followed by step $134_4$ of sending $SR_f$ data from the f'th program and updating M and $D_f$: $D_f=0$; $M=M-(SR_f-D_f)$. If $SR_f>D_f$ and $(SR_f-D_f)>M$ then step $134_2$ is followed by step $134_5$ of sending $(D_f+M)$ data from the f'th program and updating M and $D_f$: $D_f=0$; $M=0$.

Steps $134_2$–$134_5$ are followed by step 136.

It is noted that portions of the same macroblock group can be independently scheduled to be transmitted and/or transmitted. In some cases, macroblock group modification decisions can take place after some portions were already scheduled to be transmitted. Assuming that all the portions of a macroblock group must be modified in the same manner, there is a need to check whether late modification decisions can be implemented.

Figure 6:
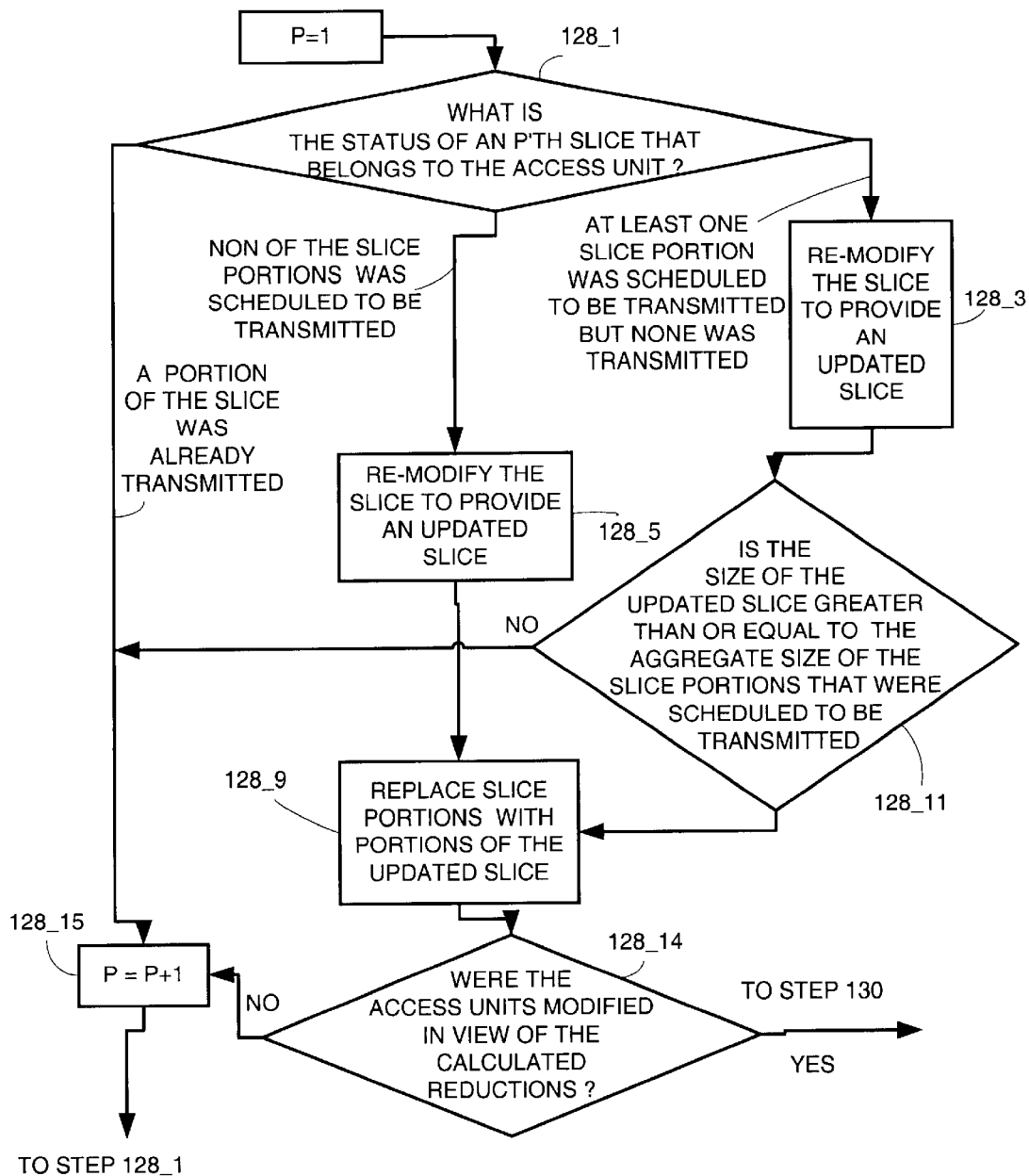
FIG. 6 is a flow chart diagram illustrating in greater details some steps of a method for generating a multiplexed sequence of media units, according to a preferred embodiment of the invention.

FIG. 6 illustrates in further detail step 128 of modifying access units in view of calculated reductions, for allowing to implement more than a single macroblock group modification decision, in view of the status of the macroblock group portions.

Step 128 starts by step 128_0 of setting a variable P: P=1. Variable P allows for scanning the macroblock groups of an access unit. Step 128_0 is followed by step 128_1 of checking the status of the p'th macroblock group of an access unit that is scheduled to be modified, in view of the determination of steps 120–126. Step 128_1 can be followed by steps 128_3, 128_5 or 128_15. If at least a portion of the p'th macroblock group was already transmitted, then assuming that all the macroblock group portion must be modified at the same manner, further modifications are prevented and step 128_1 is followed by step 128_15 of increasing index P. If non of the portions of the p'th macroblock group were scheduled to be transmitted, then the p'th macroblock group can be re-modified, and step 128_1 is followed by step 128_5 of re-modifying the p'th macroblock group to provide an updated p'th macroblock group. Step 128_5 is followed by step 128_9 of replacing the p'th macroblock group with the updated p'th macroblock group. If at least one portion of the p'th macroblock group was scheduled to be transmitted but was not actually transmitted, then step 128_1 is followed by step 128_3. Step 128_3 is followed by step 128_11 of checking if the size of the updated macroblock group exceeds the aggregate size of macroblock group portions that were scheduled to be transmitted. If the answer is "yes" step 128_11 is followed by step 128_9 of replacing macroblock group portions, including portions that were scheduled to be transmitted, with updated macroblock group portions. Else, step 128_11 is followed by step 128_15. Step 128_9 is followed by step 128_14 of checking if the access units were modified in view of the calculations. If, for example the required reductions were achieved there is no need in further reducing macroblock groups. If the answer is "yes" step 128_14 is followed by step 130, else it is followed by step 128_15. Step 128_15 is followed by step 128_1.

Figure 7A:
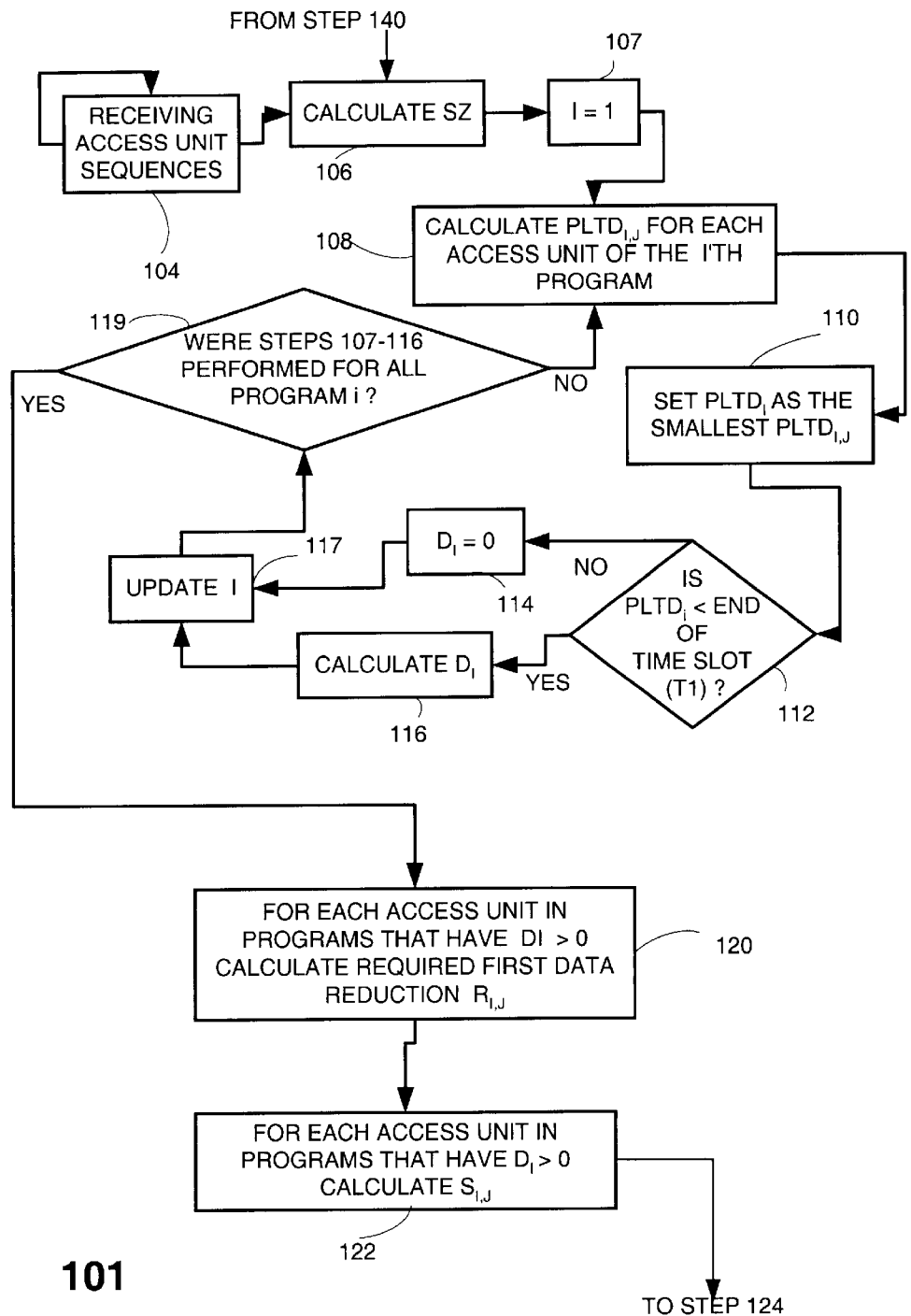

Referring to FIGS. 7A–7B, illustrating method 101 for generating a multiplexed sequence of media units.

Method 101 of FIGS. 7A–7B is analogues to method 100 of FIG. 2 but has additional steps 129 and 131 and modified step 132' instead of step 132.

Step 129 is preceded by step 128 of modifying access units in view of calculated reductions. According to an aspect of the invention the actual reductions may be smaller than the required/calculated reductions. This can result from the un-predictive nature of media unit reduction, and from various constraints such as minimal quality thresholds, signal to noise limitations, amount of allowable compression, and the like. Some media unit sections can be protected against further compression according to a pre-defined scheme. For example, a scheme that does not allow to recompress macroblocks that were previously compressed to a predefined compression threshold.

Accordingly, step 128 must be followed by step 129 of checking if the access units were sufficiently reduced. If the answer is "no" step 129 is followed by step 131 of calculating $ABR_i$, $ABR_i$ will be later used to determine which program to transmit during step 134. If the answer is "yes" step 129 is followed by step 130. Step 131 is followed by step 130.

$ABR_i = (PLTD_i - T1) * BR_i / (T_i - DTS_{i,last})$; whereas $DTS_{i,last}$ is the DTS of the last access units out of $AU_{i,j}$ that influences the $PLTD_i$.

$ABR_i$ can also be calculated by the steps of:

Calculating $ABR_{i,j}$: $ABR_{i,j} = (PLTD_{i,j} - T1) * BR_i / (T_i - DTS_{i,last})$. $ABR_i = \max(ABR_{i,j})$.

Step 132' is analogues to step 132 but the transmission priority of each program is further responsive to $ABR_i$. Conveniently, the transmission priority is proportional to ABR. Data shall be delivered from the program with the highest ABR. If data must be sent from a program during a current time slot—$DTS_{i,last} < T1$ the i'th program is assigned the highest transmission priority.

It will be apparent to those skilled in the art that the disclosed subject matter may be modified in numerous ways and may assume many embodiments other then the preferred form specifically set out and described above.

Accordingly, the above disclosed subject matter is to be considered illustrative and not restrictive, and to the maximum extent allowed by law, it is intended by the appended claims to cover all such modifications and other embodiments, which fall within the true spirit and scope of the present invention.

The scope of the invention is to be determined by the broadest permissible interpretation of the following claims and their equivalents rather then the foregoing detailed description.

What is claimed is:

1. A method for generating a multiplexed sequence, the method comprising the steps of:
    receiving at least one media unit sequence;
    for each media unit sequence performing the steps of:
        calculating a sequence time threshold, in response to:
            (a) timing information embedded within the media unit sequence, (b) an estimated allocated bit rate of the media unit sequence, and (c) aggregate size of at least some media units belonging to the media unit sequence;
        determining a target size of a media unit group in response to the corresponding sequence time threshold, the media unit group comprising at least some of the media units of the sequence;
        decreasing the size of the media unit group by modifying at least one media unit of the media unit group, to generate at least one corresponding modified media unit, if the size of the media unit group is greater than the target size; and
        appending at least one corresponding modified media unit in place of the media units to the multiplexed sequence, if the at least one corresponding modified media unit was generated during the step of decreasing the size of the media unit group.

2. The method according to claim 1 wherein the sequence time threshold is proportional to the estimated allocated bit rate.

3. The method according to claim 1 wherein each media unit is associated with timing information reflecting an upper time limit for appending the media unit to the multiplexed sequence.

4. The method according to claim 3 wherein the step of calculating a sequence time threshold comprising calculating a media unit time threshold, for at least one media unit belonging to the media unit sequence.

5. The method according to claim 4 further comprising selecting the smallest media unit time threshold as the sequence time threshold.

6. The method according to claim 4 wherein a media unit time threshold of a media unit is inversely proportional to an aggregate size of media units from the media unit sequence that are characterized by having an upper time limit that does not exceed the upper time limit of the media unit.

7. The method according to claim 4 wherein a media unit time threshold of each media unit is inversely proportional to an estimated allocated bit rate of a media unit sequence that comprises the media unit.

8. The method according to claim 4 wherein a media unit time threshold of each media unit is proportional to timing information associated with the media unit.

9. The method according to claim 4 wherein the media unit time threshold reflects a latest time for allowing to start appending selected media units to the multiplexed sequence in accordance with the time limitations of each of the selected media units, wherein each selected media unit is characterized by an upper time limit that does not exceed the upper time limit of the media unit.

10. The method according to claim 4 wherein media units are modified in response to their media unit time threshold.

11. The method according to claim 10 wherein media units are modified in response to an available bandwidth of a communication channel through which the corresponding modified media units are to be transmitted.

12. The method according to claim 1 wherein the sequence time threshold is further responsive to media unit sequence constraints.

13. The method according to claim 12 wherein media units are decodeable by a media unit decoder and wherein media unit sequence constraints reflect a simulated status of the media unit decoder.

14. The method according to claim 1 wherein the media units are MPEG compliant.

15. The method according to claim 1 wherein the media units are access units.

16. The method according to claim 1 wherein the timing information relates to decoding time stamp.

17. The method according to claim 1 wherein the estimated allocated bit rate of a media unit sequence is proportional to an input bit rate of the media unit sequence.

18. The method according to claim 1 wherein the estimated allocated bit rate of a media unit sequence is inversely proportional to a time period during which the media units of the sequence must be transmitted.

19. The method according to claim 1 wherein the estimated allocated bit rate remains constant throughout a timeslot of a predefined length.

20. The method of claim 19 wherein the estimated allocated bit rate is calculated by the steps of:

calculating a variable $PS^{i,g}$: $PS^{i,g}=|AU^{i,1}|+ \ldots +|AU^{i,g}|$;

calculating $IBR^{i,g}$: $IBR^{i,g}=PPD^{i,g}/(DTS^{i,g}-T0)$;

calculating $B_i$: $B_i=\max\{IBR^{i,g}\} 1 \leq g \leq G$; and calculating a normalized bit rate: $BR_i=B_i*(BW_T/\Sigma B_i)$;

whereas G is a number of media units of the i'th media unit sequence; $|AU^{i,g}|$ is a size of a g'th media unit of the i'th media unit sequence, before being modified; $BW_T$ is the aggregate available bit rate of a communication medium over which the multiplexed sequence is to be transmitted; $DTS^{i,g}$ is the decoding time stamp of the g'th media unit of the i'th media unit sequence; $PPD^{i,g}$ is a media unit sequence pending data of the j'th media unit of the i'th media unit sequence, and the time slot starts at T0.

21. The method of claim 1 wherein a media unit is modified in response to a priority of the media unit, a priority of a media unit sequence to which the media unit belongs or to a priority of a portion of the media unit sequence to which the media unit belongs.

22. The method of claim 1 wherein the estimated allocated bit rate of a media unit sequence is responsive to a predefined priority of the sequence.

23. The method according to claim 1 wherein each media unit comprising a plurality of media unit portions, each media unit portion comprising timing information; and wherein the step of appending including appending media unit portions to the multiplexed sequence.

24. The method according to claim 23 wherein the step of appending further comprises a steps of:

delaying an appending of a media unit portion to the multiplexed sequence for a predetermined time period; and modifying the media unit portion to provide a modified media unit portion, and replacing the media unit portion by the modified media portion, in response to modifications of other media unit portions belonging to the same media unit.

25. A method for generating a multiplexed sequence, the method comprising the steps of:

receiving at least one media unit sequence;

defining, for each media unit sequence, a media unit sub-sequence comprising media units that are complying with a sub-sequence timing constraint;

for each media unit sub-sequence performing the steps of:

calculating a sub-sequence time threshold, in response to: (a) timing information embedded within the media unit sub-sequence, (b) an estimated allocated bit rate of the media unit sub-sequence, and (c) aggregate size of at least some media units belonging to the media unit sub-sequence;

decreasing the size of the media unit sub-sequence, by modifying at least one media unit belonging to the media unit sub-sequence to generate at least one corresponding modified media unit, in response to a bit rate allocated to the media unit sub-sequence; and appending the at least one corresponding modified media unit in place of the at least one media unit to the multiplexed sequence, if the at least one corresponding modified media unit was generated during the step of decreasing the size of the media unit sub-sequence.

26. The method according to claim 25 wherein each media unit includes timing information reflecting an upper time limit for appending the media unit to the multiplexed sequence.

27. The method according to claim 26 wherein the media unit sub-sequence includes media units that have upper time limits that do not exceed a sub-sequence timing threshold.

28. The method according to claim 27 wherein each media unit comprising a plurality of media unit portions, each media unit portion comprising timing information; and wherein the step of appending including appending media unit portions to the multiplexed sequence.

29. The method according to claim 28 wherein the step of appending further comprises a steps of:

delaying an appending of a media unit portion to the multiplexed sequence for a predetermined time period; and modifying the media unit portion to provide a modified media unit portion, and replacing the media unit portion by the modified media portion, in response to modifications of other media unit portions belonging to the same media unit.

30. The method according to claim 25 wherein the sub-sequence time threshold is proportional to the estimated allocated bit rate.

31. The method according to claim 25 wherein each media unit is associated with timing information reflecting an upper time limit for appending the media unit to the multiplexed sequence.

32. The method according to claim 31 wherein the step of calculating a sub-sequence time threshold comprising calculating a media unit time threshold, for at least one media unit belonging to the sub-sequence.

33. The method according to claim 32-further comprising selecting the smallest media unit time threshold as the sub-sequence time threshold.

34. The method according to claim 32 wherein a media unit time threshold of each media unit is inversely proportional to an aggregate size of media units from the media unit sub-sequence that are characterized by having an upper time limit that does not exceed the upper time limit of the media unit.

35. The method according to claim 32 wherein a media unit time threshold of each media unit is inversely proportional to an estimated allocated bit rate of a media unit sub-sequence that comprises the media unit.

36. The method according to claim 32 wherein a media unit time threshold of each media unit is proportional to timing information associated with the media unit.

37. The method according to claim 32 wherein the media unit time threshold reflects a latest time for allowing to start appending selected media units to the multiplexed sequence in accordance with the time limitations of each of the selected media units, wherein each selected media unit is characterized by an upper time limit that does not exceed the upper time limit of the media unit.

38. The method according to claim 32 wherein media units are modified in response to their media unit time threshold.

39. The method according to claim 38 wherein media units are modified in response to an available bandwidth of a communication channel through which the corresponding modified media units are to be transmitted.

40. The method according to claim 25 wherein the sub-sequence time threshold is further responsive to media unit sequence constraints.

41. The method according to claim 40 wherein media units are decodeable by a media unit decoder and wherein media unit sequence constraints reflect a simulated status of the media unit decoder.

42. The method according to claim 25 wherein the media units are MPEG compliant.

43. The method according to claim 25 wherein the media units are access units.

44. The method according to claim 25 wherein the timing information relates to decoding time stamp.

45. The method according to claim 25 wherein the estimated allocated bit rate of a media unit sub-sequence is proportional to an input bit rate of the media unit sequence.

46. The method according to claim 25 wherein the estimated allocated bit rate of a media unit sub-sequence is inversely proportional to a time period during which the media units of the sub-sequence must be transmitted.

47. The method according to claim 25 wherein the estimated allocated bit rate remains constant throughout a time slot of a predefined length.

48. The method of claim 47 wherein the estimated allocated bit rate is calculated by the steps of:
calculating a variable $PS^{i,g}$: $PS^{i,g}=|AU^{i,1}|+ \ldots +|AU^{i,g}|$;
calculating $IBR^{i,g}$: $IBR^{i,g}=PPD^{i,g}/(DTS^{i,g}-T0)$;
calculating $B_i$: $B_i=\max\{IBR^{i,g}\} 1 \leq g \leq G$; and
calculating a normalized bit rate : $BR_i=B_i*(BW_T/\Sigma B_i)$;
whereas G is a number of media units of the i'th sub-sequence of media units; $|AU^{i,g}|$ is a size of a g'th media unit of the i'th sub-sequence of media units, before being modified; $BW_T$ is the aggregate available bit rate of a communication medium over which the multiplexed sequence is to be transmitted; $DTS^{i,g}$ is the decoding time stamp of the g'th media unit of the i'th media unit sub-sequence; $PPD^{i,g}$ is a media unit sub-sequence pending data of the j'th media unit of the i'th media unit sequence, and the time slot starts at T0.

49. The method of claim 25 wherein a media unit is modified in response to a priority of the media unit, a priority of a media unit sequence to which the media unit belongs or to a priority of a portion of the media unit sequence to which the media unit belongs.

50. The method of claim 25 wherein the estimated allocated bit rate of a sub-sequence is responsive to a predefined priority of the sequence.

51. A method for generating a multiplexed sequence, the method comprising the steps of:
(a) receiving at least one media unit sequence;
(b) calculating a sequence time threshold, for each received media unit sequence, in response to: (i) timing information embedded within the media unit sequence, (ii) an estimated allocated bit rate of the media unit sequence, and (iii) aggregate size of at least some media units belonging to the media unit sequence;
(c) determining, for each media unit sequence, which media units to append to the multiplexed sequence and which media units to modify to provide corresponding modified media units, in response to the sequence time threshold;
(d) modifying media units, appending media units and corresponding modified media units, in response to the determination.

52. The method according to claim 51 wherein step (c) comprising determining an amount of data that must be appended to the multiplex from a media unit sequence, during a time slot, in response to the corresponding sequence time threshold.

53. The method according to claim 52 wherein the step (c) comprising determining an amount of data reduction in response to media unit sequence constraints.

54. The method according to claim 53 wherein media unit sequence constrains reflect a maximal allowable bit rate.

55. The method according to claim 53 wherein the media units are to be provided to a media unit processor, and wherein the media sequence constraints reflect a status of the media unit processor.

56. The method according to claim 55 wherein the media unit processor comprises a media unit decoder and a media unit buffer.

57. The method according to claim 51 wherein an amount of data reduction is limited by a low data reduction limit, the low data reduction limit reflecting data that cannot be send during the time slot even when a maximal bit rate is allocated to the media unit sequence.

58. The method according to claim 57 wherein the maximal bit rate reflects media unit sequence constraints.

59. The method according to claim 57 wherein the media unit sequence is MPEG compliant, and wherein the maximal bit rate reflects a maximal allowed input bit rate to a EB.

60. The method according to claim 51 wherein the amount of data reduction is limited by a high data reduction limit, the high reduction limit reflecting a maximal data reduction that changes the sequence time threshold.

61. The method according to claim 51 wherein the sequence time threshold is proportional to the estimated allocated bit rate.

62. The method according to claim 51 wherein each media unit is associated with timing information reflecting an upper time limit for appending the media unit to the multiplexed sequence.

63. The method according to claim 51 wherein the step of calculating a sequence time threshold comprising calculating a media unit time threshold, for at least one media unit belonging to the sequence.

64. The method according to claim 63 further comprising selecting the smallest media unit time threshold as the sequence time threshold.

65. The method according to claim 63 wherein a media unit time threshold of each media unit is inversely proportional to an aggregate size of media units from the media unit sequence that are characterized by having an upper time limit that does not exceed the upper time limit of the media unit.

66. The method according to claim 63 wherein a media unit time threshold of each media unit is inversely proportional to an estimated allocated bit rate of a media unit sequence that comprises the media unit.

67. The method according to claim 63 wherein a media unit time threshold of each media unit is proportional to timing information associated with the media unit.

68. The method according to claim 63 wherein the media unit time threshold reflects a latest time for allowing to start appending selected media units to the multiplexed sequence in accordance with the time limitations of each of the selected media units, wherein each selected media unit is characterized by an upper time limit that does not exceed the upper time limit of the media unit.

69. The method according to claim 63 wherein media units are modified in response to their media unit time threshold.

70. The method according to claim 69 wherein media units are modified in response to an available bandwidth of a communication channel through which the modified media units are to be transmitted.

71. The method according to claim 70 wherein the sequence time threshold is further responsive to media unit sequence constraints.

72. The method according to claim 71 wherein media units are decodeable by a media unit decoder and wherein media unit sequence constraints reflect a simulated status of the media unit decoder.

73. The method according to claim 70 wherein the media units are MPEG compliant.

74. The method according to claim 70 wherein the media units are access units.

75. The method according to claim 70 wherein the timing information relates to decoding time stamp.

76. The method according to claim 70 wherein the estimated allocated bit rate of a media unit sequence is proportional to an input bit rate of the media unit sequence.

77. The method according to claim 70 wherein the estimated allocated bit rate of a media unit sequence is inversely proportional to a time period during which the media units of the sequence must be transmitted.

78. The method according to claim 70 wherein the estimated allocated bit rate remains constant throughout a time slot of a predefined length.

79. The method of claim 78 wherein the estimated allocated time slot is calculated by the steps of:
calculating a variable $PS^{i,g}$: $PS^{i,g}=|AU^{i,1}|+ \ldots +|AU^{i,g}|$;
calculating $IBR^{i,g}$: $IBR^{i,g}=PPD_{i,g}/(DTS^{i,g}-T0)$;
calculating $B_i$: $B_i=\max\{IBR_{i,g}\} 1 \leq g \leq G$; and
calculating a normalized bit rate: $BR_i=B_i*(BW_T/\Sigma B_i)$;
whereas G is a number of media units of the i'th sequence of media units; $|AU^{i,g}|$ is a size of a g'th media unit of the i'th sequence of media units, before being modified; $BW_T$ is the aggregate available bit rate of a communication medium over which the multiplexed sequence is to be transmitted; $DTS^{i,g}$ is the decoding time stamp of the g'th media unit of the i'th media unit sequence; $PPD^{i,g}$ is a media unit sequence pending data of the j'th media unit of the i'th media unit sequence, and the time slot starts at T0.

80. The method of claim 51 wherein media units are modified in response to the priority of the media unit sequence to which they belong.

81. The method of claim 51 wherein the estimated allocated bit rate of a sequence is responsive to a predefined priority of the sequence.

82. The method according to claim 51 wherein each media unit comprising a plurality of media unit portions, each media unit portion comprising timing information; and
wherein the step of appending including appending media unit portions to the multiplexed sequence.

83. The method according to claim 82 wherein the step of appending further comprises a steps of:
delaying an appending of a media unit portion to the multiplexed sequence for a predetermined time period; and
modifying the media unit portion to provide a modified media unit portion, and replacing the media unit portion by the modified media portion, in response to modifications of other media unit portions belonging to the same media unit.

84. The method according to claim 51 wherein each media unit includes timing information reflecting an upper time limit for appending the media unit to the multiplexed sequence.

85. The method according to claim 84 wherein the media unit sub-sequence includes media units that have upper time limits that do not exceed a sub-sequence timing threshold.

86. The method of claim 51 further comprising step of determining, for each media unit sub-sequence a media unit sub-sequence transmission priority and transmitting media units belonging to the media unit sub-sequence in response to the media unit sub-sequence transmission priority.

87. The method of claim 86 wherein a media unit sub sequence transmission priority of a i'th media unit sub sequence is responsive to a variable $ABR_i$, wherein $ABR_i=(PLTD_i-T1)*BR_i/(T1-DTS_{i,last})$; whereas $DTS_{i,last}$ is a DTS of a last access units out of $AU_{i,j}$ that influences $PLTD_i$.

88. The method of claim 86 wherein a media unit sub sequence transmission priority of a i'th media unit sub sequence is responsive to a variable $ABR_i$, wherein $ABR_i= \max(ABR_{i,j})$ and $ABR_{i,j}=(PLTD_{i,j}-T1)*BR_i/(T1-DTS_{i,last})$.

89. The method of claim 1 further comprising step of determining, for each media unit sequence a media unit sequence transmission priority and transmitting media units belonging to the media unit sequence in response to the media unit sequence transmission priority.

90. The method of claim 89 wherein a media unit sequence transmission priority of a i'th media unit sequence is responsive to a variable $ABR_i$, wherein $ABR_i=(PLTD_i-$ $T1)*BR_i/(T1-DTS_{i,last})$; whereas $DTS_{i,last}$ is a DTS of a last access units out of $AU_{i,j}$ that influences $PLTD_i$.

91. The method of claim 89 wherein a media unit sequence transmission priority of a i'th media unit sequence is responsive to a variable $ABR_i$, wherein $ABR_i$=max $(ABR_{i,j})$ and $ABR_{i,j}=(PLTD_{i,j}-T1)*BR_i/(T1-DTS_{i,last})$.

* * * * *